US010506656B2

(12) United States Patent
Yu et al.

(10) Patent No.: US 10,506,656 B2
(45) Date of Patent: Dec. 10, 2019

(54) ELECTRONIC DEVICE AND METHOD FOR PERFORMING ANTENNA TUNING

(71) Applicant: SAMSUNG ELECTRONICS CO., LTD., Suwon-si, Gyeonggi-do (KR)

(72) Inventors: Hyungjoon Yu, Suwon-si (KR); Youngkwon Lee, Suwon-si (KR); Namkyeom Kim, Suwon-si (KR); Sungte Kang, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/282,865

(22) Filed: Feb. 22, 2019

(65) Prior Publication Data
US 2019/0268954 A1 Aug. 29, 2019

(30) Foreign Application Priority Data

Feb. 23, 2018 (KR) .................. 10-2018-0022229

(51) Int. Cl.
*H04W 76/15* (2018.01)
*H04B 1/38* (2015.01)
*H04W 84/04* (2009.01)

(52) U.S. Cl.
CPC .............. *H04W 76/15* (2018.02); *H04B 1/38* (2013.01); *H04W 84/042* (2013.01)

(58) Field of Classification Search
CPC ......... H04W 76/15; H04B 1/38; H04B 1/401; H04B 1/18
See application file for complete search history.

(56) References Cited

U.S. PATENT DOCUMENTS 10,136,446 B2 * 11/2018 Maheshwari ......... H04W 72/10
2005/0024288 A1 2/2005 Saito
(Continued)

FOREIGN PATENT DOCUMENTS

CN    106027113 A  * 10/2016
CN    106027113 B  *  3/2019
(Continued)

OTHER PUBLICATIONS

Search Report and Written Opinion dated May 28, 2019 in counterpart International Patent Application No. PCT/KR2019/001986.

*Primary Examiner* — Devan A Sandiford
(74) *Attorney, Agent, or Firm* — Nixon & Vanderhye, P.C.

(57) ABSTRACT

Disclosed is an electronic device including: a housing; a wireless communication circuit disposed within the housing and configured to transmit and/or receive at least one Radio Frequency (RF) signal; a plurality of antennas disposed within the housing and/or as part of the housing and electrically connected to the wireless communication circuit; at least one processor operationally connected to the wireless communication circuit; and a memory operationally connected to the at least one processor, wherein the memory is configured to store a lookup table including a first set of antenna-tuning modes for the plurality of antennas and a second set of antenna-tuning modes for the plurality of antennas and instructions which, when executed by the processor, control the electronic device to: control the wireless communication circuit to use a first antenna-tuning mode of the first set or antenna-tuning modes based on carrier aggregation for wireless communication being deactivated, control the wireless communication circuit to use a second antenna-tuning mode of the second set of antenna-tuning modes based on the carrier aggregation being activated, and control the wireless communication circuit to use (Continued)

a third antenna-tuning mode of the first set of antenna-tuning modes during a voice call event.

18 Claims, 13 Drawing Sheets

(56) References Cited

U.S. PATENT DOCUMENTS

| | | |
|---|---|---|
| 2013/0201850 A1 | 8/2013 | Swaminathan et al. |
| 2014/0092795 A1* | 4/2014 | Granger-Jones .......... H04L 5/08 370/297 |
| 2014/0192725 A1 | 7/2014 | Black et al. |
| 2014/0334362 A1* | 11/2014 | Granger-Jones .......... H04L 5/08 370/297 |
| 2014/0370824 A1 | 12/2014 | Larsen et al. |
| 2014/0376417 A1* | 12/2014 | Khlat ...................... H04L 5/001 370/277 |
| 2015/0230206 A1* | 8/2015 | Tabet .................... H04W 72/02 370/329 |
| 2015/0236747 A1* | 8/2015 | Baudin .................. H04B 1/401 375/219 |
| 2017/0245317 A1* | 8/2017 | Lee ....................... H04W 76/28 |
| 2017/0280503 A1 | 9/2017 | He et al. |
| 2017/0289889 A1* | 10/2017 | Sahu .................. H04L 43/0888 |
| 2017/0373398 A1* | 12/2017 | Komulainen .......... H01Q 1/243 |
| 2018/0176966 A1* | 6/2018 | Cui ....................... H04L 47/827 |

FOREIGN PATENT DOCUMENTS

| | | |
|---|---|---|
| JP | 2005-051503 | 2/2005 |
| KR | 10-1728453 | 4/2017 |
| WO | 2016/003562 | 1/2016 |

\* cited by examiner

| ANTENNA MODE | CONFIGURATION A | CONFIGURATION B | CONFIGURATION C |
|---|---|---|---|
| FREE SPACE | O | X | O |
| AP EVENT MODE (USB, EARJACK, AND THE LIKE) | O | X | O |
| CA ACTIVE | O | O | X |
| 4RXD | O | O | X |
| 4x4 MIMO | O | O | X |

ELECTRONIC DEVICE AND METHOD FOR PERFORMING ANTENNA TUNING

CROSS-REFERENCE TO RELATED APPLICATION

This application is based on and claims priority under 35 U.S.C. § 119 to Korean Patent Application Serial No. 10-2018-0022229, filed on Feb. 23, 2018, in the Korean Intellectual Property Office, the disclosure of which is incorporated by reference herein in its entirety.

TECHNICAL FIELD

The present disclosure relates to an electronic device and a method for performing antenna tuning to improve the quality of a voice service.

BACKGROUND

With the development of wireless communication systems, voice call services have come to be provided over a network. For example, even in LTE, which is a high-speed data communication packet network, Voice over Long-Term Evolution (VoLTE) may provide voice call services in a way similar to existing circuit networks. In VoLTE, a telecommunications company may guarantee quality in the same way as a mVoIP call and may also provide a higher connection speed and significantly improved call quality compared to the existing circuit call type.

LTE/5G communication, which is an environment for serving VoLTE and VoIP, is a communication standard made for data communication and may use an antenna-tuning value aiming for data-based throughput. Accordingly, when a large amount of data other than voice packets is generated while the voice service is being used, quality deterioration such as call distortion or muting may occur.

For example, in the state in which Carrier Aggregation (CA) is activated, a user terminal may use an antenna tuner value for distributing radio resources to a Primary cell (P cell) and a Secondary cell (S cell) by controlling the electric fields of the P cell and the S cell such that they converge on an average value. That is, since the user terminal uses an antenna-tuning value aiming for maximum throughput optimized for data-based lab performance, a VoLTE service provided using the P cell may not provide the best performance.

SUMMARY

According to various embodiments the disclosure may provide, when a voice service starts while CA is activated, an electronic device and a method first considering the quality of the voice service even while CA is activated by tuning antennas through at least one transmission frequency tuned for the P cell.

In accordance with an aspect of the present disclosure, an electronic device is provided. The electronic device includes: a housing; a wireless communication circuit disposed within the housing and configured to transmit and/or receive at least one Radio Frequency (RF) signal; a plurality of antennas disposed within the housing and/or as part of the housing and electrically connected to the wireless communication circuit; at least one processor operationally connected to the wireless communication circuit; and a memory operationally connected to the at least one processor, wherein the memory is configured to store a lookup table including a first set of antenna-tuning modes for the plurality of antennas and a second set of antenna-tuning modes for the plurality of antennas and instructions which, when executed by the processor, control the electronic device to: control the wireless communication circuit to use a first antenna-tuning mode of the first set of antenna-tuning modes based on carrier aggregation for wireless communication being deactivated, control the wireless communication circuit to use a second antenna-tuning mode of the second set of antenna-tuning modes based on carrier aggregation being activated, and control the wireless communication circuit to use a third antenna-tuning mode of the first set of antenna-tuning modes during a voice call event.

In accordance with another aspect of the present disclosure, an electronic device is provided. The electronic device includes: a housing; a wireless communication circuit disposed within the housing and configured to transmit and/or receive at least one Radio Frequency (RF) signal; a plurality of antennas disposed within the housing and/or as part of the housing and electrically connected to the wireless communication circuit; at least one processor operationally connected to the wireless communication circuit; and a memory operationally connected to the at least one processor, wherein the memory is configured to store a lookup table including a first set of antenna-tuning modes for the plurality of antennas and a second set of antenna-tuning modes for the plurality of antennas and instructions which, when executed by the processor, control the electronic device to: control the wireless communication circuit to use a first antenna-tuning mode of the first set of antenna-tuning modes based on carrier aggregation for wireless communication being deactivated, control the wireless communication circuit to use a second antenna-tuning mode of the second set of antenna-tuning modes based on carrier aggregation being activated, and to control the wireless communication circuit to use a third antenna-tuning mode corresponding to a voice call when a voice call is made while carrier aggregation is activated.

In accordance with another aspect of the present disclosure, an electronic device is provided. The electronic device includes: a housing; a wireless communication circuit disposed within the housing and configured to transmit and/or receive at least one Radio Frequency (RF) signal; a plurality of antennas disposed within the housing and/or as part of the housing and electrically connected to the wireless communication circuit; at least one processor operationally connected to the wireless communication circuit; and a memory operationally connected to the at least one processor, wherein the memory is configured to store a lookup table including antenna-tuning modes for a plurality of antennas and instructions which, when executed by the processor, control the electronic device to: control the wireless communication circuit to use a first antenna-tuning mode corresponding to a voice call based on a voice call event being generated in a first protocol stack, and ignore a request for changing to the antenna-tuning mode based on a data service event being generated in a second protocol stack while the voice call event is performed and the request for changing to a second antenna-tuning mode corresponding to the data service event is made.

According to various embodiments, it is possible to provide an electronic device and a method for, when a voice service starts, preventing and/or reducing quality deterioration such as call distortion or muting by optimizing and/or improving an antenna tuner value for quality of the voice service.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
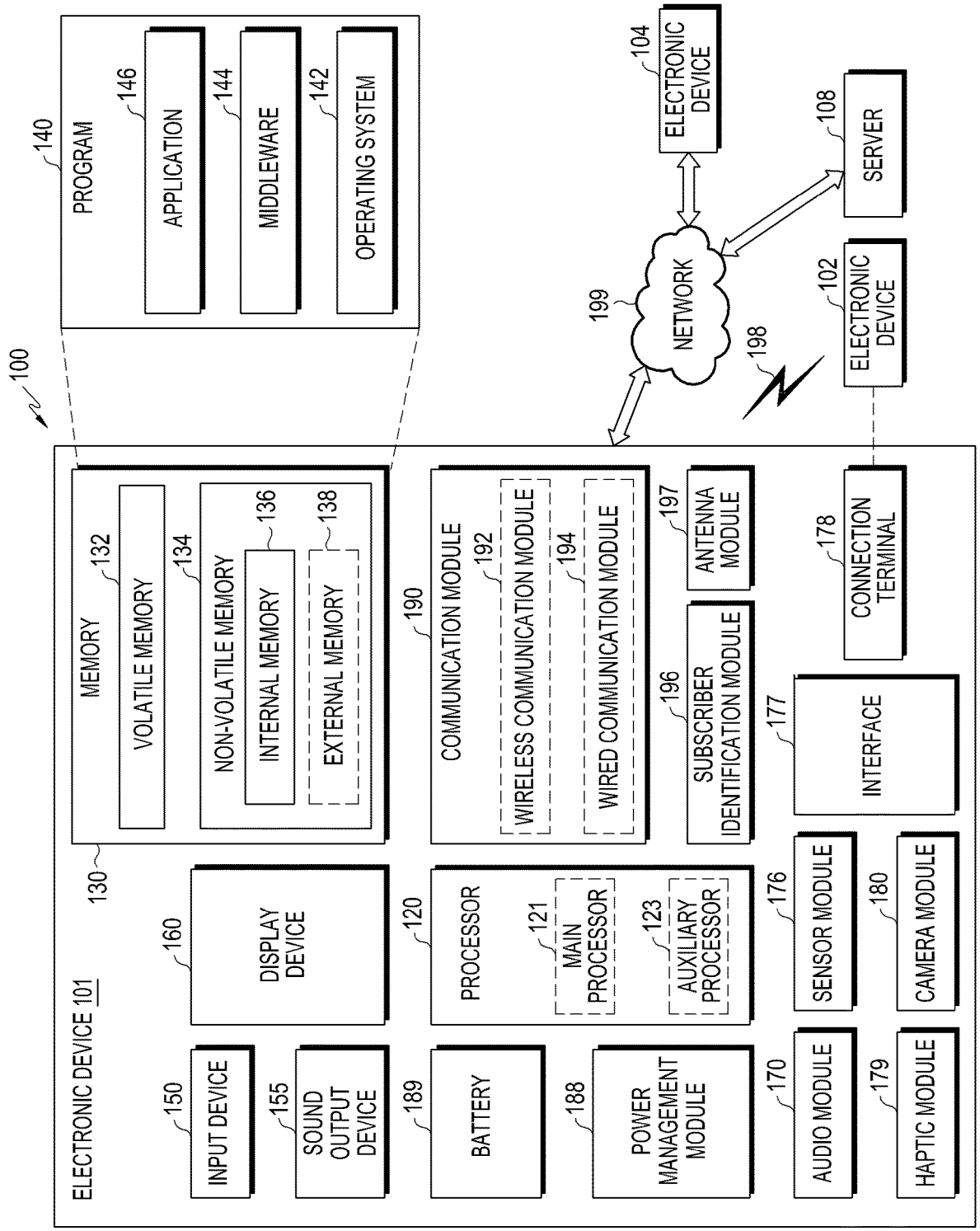
FIG. 1 is a block diagram illustrating an example electronic device 101 within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

Figure 2:
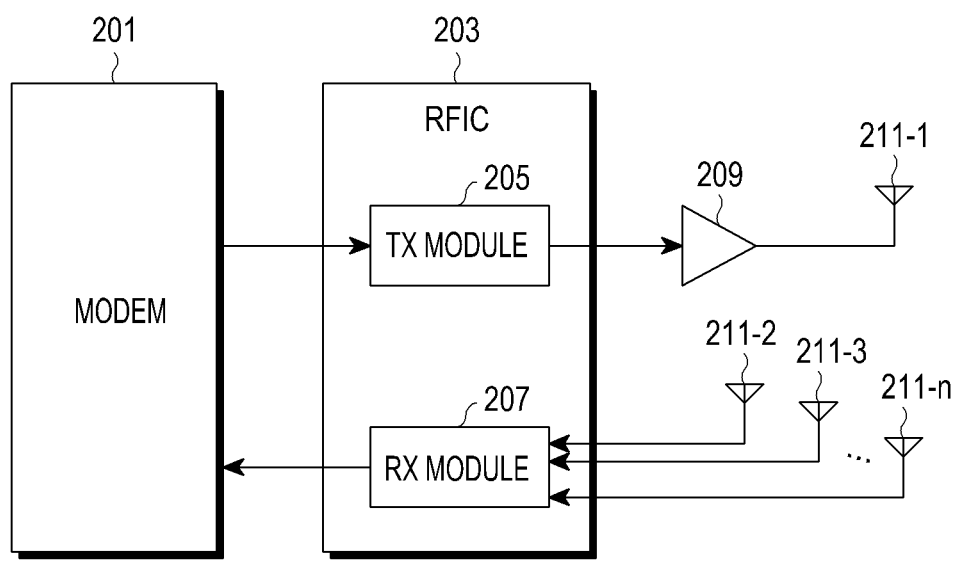
FIG. 2 is a block diagram illustrating an example electronic device according to various embodiments.

FIG. 2 is a block diagram illustrating an example electronic device according to various embodiments. According to an embodiment, the electronic device 101 may include a MODEM 201, a Radio Frequency (RF) IC 203 including a Tx module (e.g., including transmission circuitry) 205 and an Rx module (e.g., including receiving circuitry) 207, a Pulse Amplitude Modulation (PAM) (e.g., including an amplifier circuit) 209, and a plurality of antennas 211-1 to 211-n. The MODEM 201 and the RFIC 203 of FIG. 2 may be elements included in the communication module 190 of FIG. 1, and the RAM 209 and the plurality of antennas 211-1 to 211-m of FIG. 2 may be elements included in the antenna module 197 of FIG. 1.

Referring to FIG. 2, the MODEM 201 may be connected to the Tx module 205 and the Rx module 207 of the RFIC 203. The MODEM 201 may transmit a signal to an external electronic device (for example, a base station (BS)) through the Tx module 205 and the antenna 211-1. The PAM 209 may be connected to the Tx module 205 and may include various circuitry to amplify the transmission power of the signal. The MODEM 201 may receive a signal from the external electronic device (for example, the BS) through the Rx module 207 and at least one of the plurality of antennas 211-2 to 211-*n*. Although FIG. 2 illustrates that the Tx module 205 is connected to one antenna 211-1, the disclosure is not limited thereto.

Figure 3A:
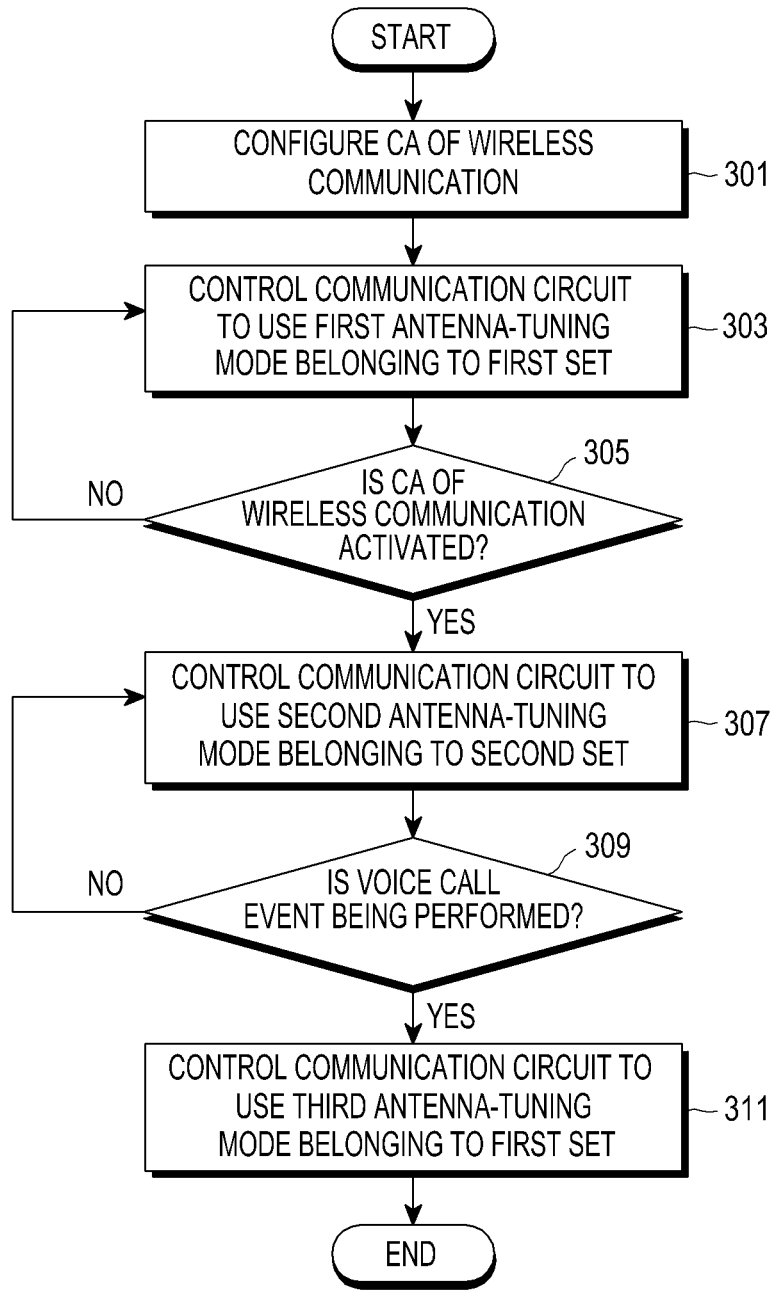
FIG. 3A is a flowchart illustrating an example operation in which the electronic device uses an antenna-tuning mode according to various embodiments.

FIG. 3A is a flowchart illustrating an example operation in which the electronic device uses an antenna-tuning mode according to various embodiments.

According to various embodiments, the electronic device 101 (for example, the processor 120) may configure the carrier aggregation of wireless communication in operation 301. For example, the configuration of the carrier aggregation of wireless communication may refer, for example, to the electronic device 101 receiving a cell different from an operation cell from a Base Station (BS).

According to various embodiments, in operation 303, the electronic device 101 may control a communication circuit to use a first antenna-tuning mode belonging to a first set. For example, antenna-tuning modes belonging to the first set may, for example, be modes that can be used both in a state in which a voice call event occurs (or during the voice call event) and in a state in which the voice call event is not performed. For example, the electronic device 101 may use antenna-tuning modes corresponding to one or more predetermined states (for example, and without limitation, a basic state, a USB-connected state, and a flip-cover-mounted state) of the electronic device 101 both in the state in which the voice call event is performed and in the state in which the voice call event is not performed. The first set may, for example, and without limitation, be a set of antenna-tuning modes corresponding to a free space (basic state), a USB (USB-connected state), and a flip cover (flip-cover-mounted state), or the like.

According to various embodiments, in operation 305, the electronic device 101 may identify (determine) whether the carrier aggregation of wireless communication is activated. The activation of the carrier aggregation of wireless communication may refer, for example, to the electronic device 101 performing communication using two or more different carriers. When carrier aggregation is not activated (No) in operation 303, the electronic device 101 may maintain the first antenna-tuning mode.

According to various embodiments, when carrier aggregation is activated, the electronic device 101 may control the communication circuit to use a second antenna-tuning mode belonging to a second set in operation 307. Examples of antenna-tuning modes belonging to the second set may include, for example, antenna-tuning modes corresponding to activation of carrier aggregation. According to an embodiment, the antenna-tuning modes belonging to the second set may include, for example, modes that are not used while the voice call event is being performed. For example, the electronic device 101 may use antenna-tuning modes corresponding to CA activation and 4Rx Diversity (4RxD) while the voice call event is not being performed, but may not use the antenna-tuning modes corresponding to the CA activation and 4RxD while the voice call event is being performed. The second set may be a set of antenna-tuning modes corresponding to the CA activation and 4RxD. In the disclosure, 4Rx D may refer, for example, to four antennas being set as antennas (including an RFIC Rx path) for receiving signals.

According to various embodiments, the electronic device 101 may identify (determine) whether a voice call event is being performed in operation 309. For example, the voice call event may include a voice service based on Voice over Long-Term Evolution (VoLTE). For example, the voice call event may be generated when the electronic device 101 receives a call from an external electronic device and/or transmits a call to an external electronic device. When the voice call event is not being performed, the electronic device 101 may return to operation 307 or may maintain the second antenna-tuning mode.

According to various embodiments, when the voice call event is being performed, the electronic device 101 may control the communication circuit to use a third antenna-tuning mode belonging to the first set in operation 311. When carrier aggregation is activated and the voice call event is being performed, the electronic device 101 may control the communication circuit to use the third antenna-tuning mode belonging to the first set. The communication circuit may use the third antenna-tuning mode belonging to the first set and not use the second antenna-tuning modes belonging to the second set while the voice call event is being performed under the control of the electronic device 101.

Figure 3B:
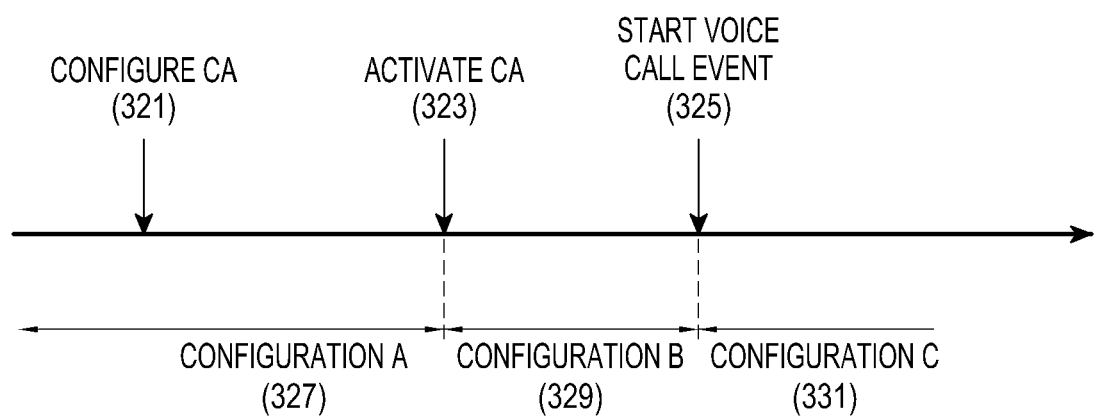
FIG. 3B is a diagram illustrating an example operation for using an antenna-tuning mode for a voice service according to various embodiments.

FIG. 3B is a diagram illustrating an example operation for using an antenna-tuning mode for a voice service according to various embodiments. Configuration A may refer, for example, to antenna-tuning modes corresponding to one or more predetermined states (for example, a basic state, a USB-connected state, and a flip-cover-mounted state) of the electronic device being used in the state in which electronic device 101 is served by one cell. Configuration B may refer, for example, to antenna-tuning modes corresponding to one or more predetermined states (for example, whether CA is activated and whether 4×4 MIMO is applied) being used in the state in which the electronic device 101 is served by at least two cells (for example, in the state in which carrier aggregation is activated). Configuration C may refer, for example, to antenna-tuning modes corresponding to one or more predetermined states (for example, a basic state, a USB-connected state, and a flip-cover-mounted state) of the electronic device 101 being used while the electronic device 101 is served by at least two cells (for example, carrier aggregation is activated) and the voice call event is being performed. The antenna-tuning modes corresponding to the one or more predetermined states of the electronic device 101 may, for example, be included in a lookup table stored, for example, in a memory.

Referring to FIG. 3B, the electronic device 101 may operate in configuration A 327 in the state in which carrier aggregation is configured as indicated by reference numeral 321. For example, the electronic device 101 may operate in configuration A 327 in the state in which the electronic device 101 is served by one cell. When carrier aggregation is activated as indicated by reference numeral 323, the electronic device 101 may operate in configuration B 329. For example, when carrier aggregation is activated in configuration B 329, the electronic device 101 may use antenna-tuning modes for converging electric fields of a Primary cell (P cell) and a Secondary cell (S cell) to an average value for a data service in configuration B 329. For example, the operation in configuration B 329 may refer, for example, to the electronic device 101 tuning antennas to distribute radio resources to the P cell and the S cell when carrier aggregation is activated. According to an embodiment, when the voice call event starts, as indicated by reference numeral 325, the electronic device 101 may operate in configuration C 331. For example, when the voice call event starts, as indicated by reference numeral 325, in the state in which carrier aggregation is activated, the electronic device 101 may perform the voice call event using the P cell in configuration C 331. When the electronic device 101 operates in configuration B 329, the antennas are tuned to distribute radio resources to the P cell and the S cell, and thus the quality of the voice call event using the P cell may not be considered. When the voice call event starts, as indicated by reference numeral 325, in the state in which carrier aggregation is activated, the electronic device 101 may operate in configuration C 331 tuning antennas for the performance of the P cell for the quality of the voice call event. For example, the operation in configuration C 331 may refer, for example, to the electronic device 101 tuning antennas for the best performance of the P cell in the state in which carrier aggregation is activated.

Figure 4A:
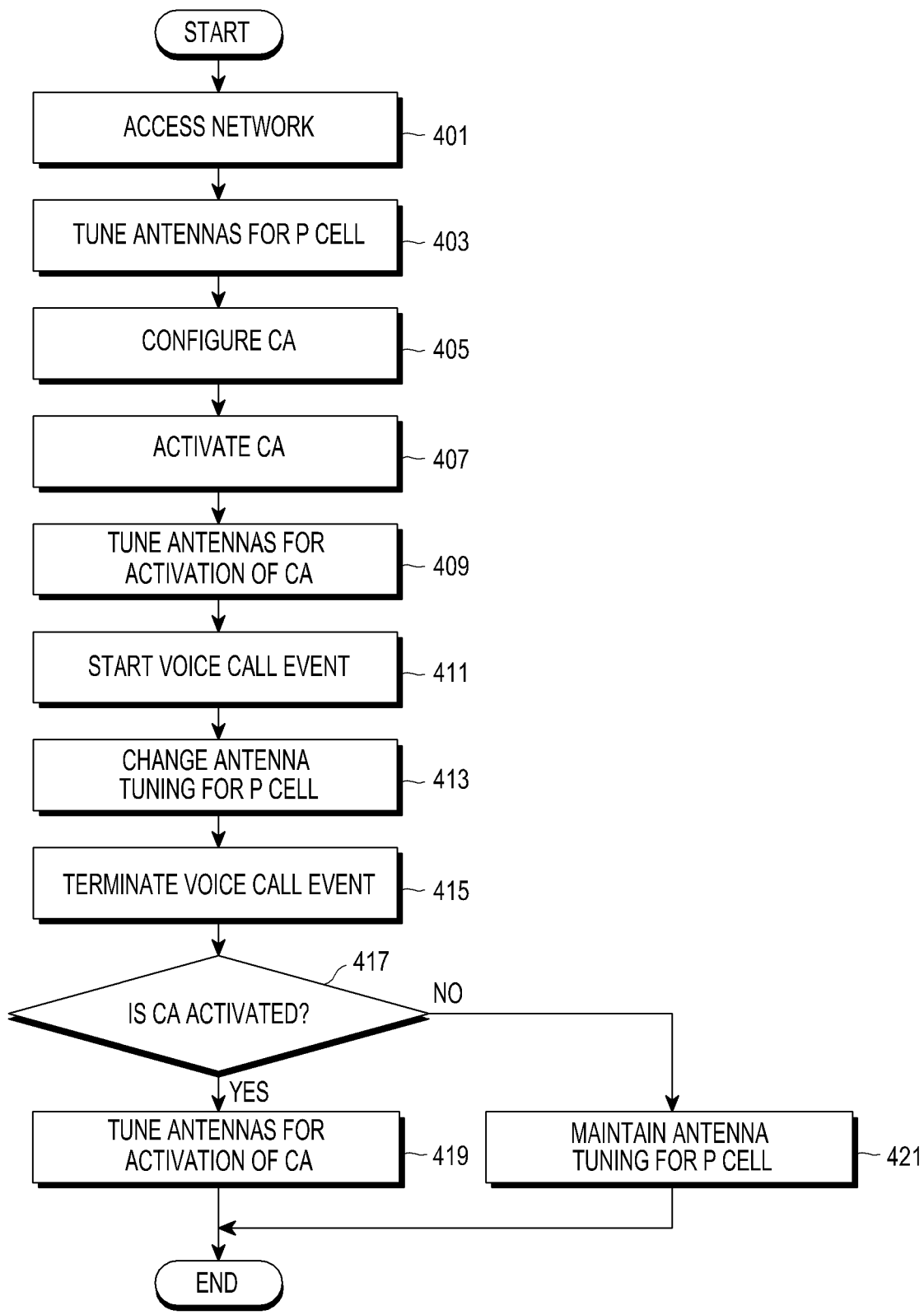
FIG. 4A is a flowchart illustrating an example operation in which the electronic device uses an antenna-tuning mode according to various embodiments.

FIG. 4A is a flowchart illustrating an example operation in which the electronic device uses an antenna-tuning mode according to various embodiments.

According to various embodiments, the electronic device 101 (for example, the processor 120) may access the network in operation 401. At this time, the electronic device 101 may operate in one cell.

According to various embodiments, the electronic device 101 may tune antennas for the P cell in operation 403. For example, the P cell may be one cell in which the electronic device 101 operates in operation 401. For example, tuning the antennas for the P cell by the electronic device 101 may refer, for example, to tuning antennas based on a transmission frequency of the P cell in order to optimize and/or improve transmission performance.

According to various embodiments, the electronic device 101 may configure carrier aggregation in operation 405. The configuration of carrier aggregation may refer, for example, to reception of the S cell from the BS.

According to various embodiments, the electronic device 101 may activate carrier aggregation in operation 407. The activation of carrier aggregation may refer, for example, to execution of communication using the P cell and the S cell.

According to various embodiments, the electronic device 101 may tune antennas for activating carrier aggregation in operation 409. For example, tuning of antennas for activating carrier aggregation by the electronic device 101 may refer, for example, to tuning of antennas based on all frequencies used when the P cell and the S cell do not use successive frequencies in the same band but use frequencies in different bands.

According to various embodiments, the electronic device 101 may start the voice call event in operation 411. For example, the voice call event may be based on Voice over Long-Term Evolution (VoLTE). For example, the voice call event may be performed using the P cell while carrier aggregation is activated.

According to various embodiments, the electronic device 101 may change antenna tuning for the P cell in operation 413. For example, the electronic device 101 may tune the state of the antennas tuned for electric fields of the P cell and the S cell to the state in which the antennas are tuned for the P cell. By tuning the antennas for the P cell, the quality of the voice service using the P cell may be improved.

According to various embodiments, the electronic device 101 may terminate the voice call event in operation 415. For example, when the call is terminated by the user and/or by an external electronic device, the voice call event may be terminated.

According to various embodiments, the electronic device 101 may identify (determine) whether carrier aggregation is activated in operation 417.

According to various embodiments, when carrier aggregation is activated, the electronic device 101 may tune antennas for activating carrier aggregation in operation 419. For example, the electronic device 101 may tune antennas to distribute radio resources to the P cell and the S cell.

According to various embodiments, when carrier aggregation is not activated, the electronic device 101 may maintain antenna tuning for the P cell in operation 421. In the inactive state of carrier aggregation, the electronic device 101 may operate in one cell (that is, the P cell) such that the electronic device 101 may maintain antenna tuning for the P cell of operation 413.

Figures 4B, 4C:
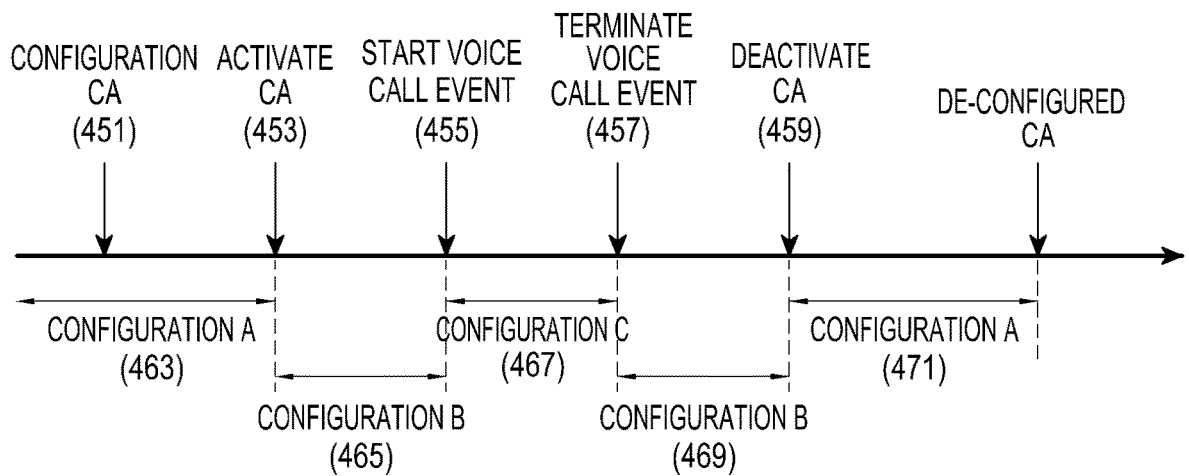
FIGS. 4B and 4C are diagrams illustrating an example operation for using an antenna-tuning mode for a voice service according to various embodiments.

FIG. 4B is a diagram illustrating an example operation for using an antenna-tuning mode for a voice call event according to various embodiments. Configuration A, configuration B, and configuration C of FIG. 4B may refer, for example, to configuration A, configuration B, and configuration C of FIG. 4C, and may be the same as, or similar to, that described with reference to FIG. 3B. Referring to FIG. 4B, when carrier aggregation is configured as indicated by reference numeral 451, the electronic device 101 may operate in configuration A 463. When carrier aggregation is activated as indicated by reference numeral 453, the electronic device 101 may operate in configuration B 465. For example, when carrier aggregation is activated, the electronic device 101 may operate in configuration B 465 for tuning antennas to distribute radio resources to the P cell and the S cell. When a voice call event starts, as indicated by reference numeral 455, while carrier aggregation is activated, the electronic device 101 may operate in configuration C 467. For example, when the voice call event starts, as indicated by reference numeral 455, while carrier aggregation is activated, the electronic device 101 may operate in configuration C 467 for tuning antennas for the performance of the P cell for the quality of the voice call event. When the voice call event ends (e.g., is terminated), as indicated by reference numeral 457, the electronic device 101 may operate in configuration B 469 again. When carrier aggregation is deactivated, as indicated by reference numeral 459, the electronic device 101 may operate in configuration A 471 again. As illustrated in FIG. 4B, when the voice call event starts, as indicated by reference numeral 455, while the electronic device 101 operates in configuration B 465 in accordance with the activation 453 of carrier aggregation, the electronic device 101 may operate in configuration C 467 rather than configuration B 441. For example, according to various embodiments, when the voice call event starts while carrier aggregation is activated, the electronic device 101 may improve the quality of the voice call event by tuning antennas for the performance of the P cell.

FIG. 4C is a diagram illustrating example antenna modes according to various embodiments. For example, the table illustrated in FIG. 4C may be a lookup table for changing the antenna configuration stored in the electronic device 101. For example, the lookup table may include antenna-tuning modes for predetermined states such as, for example, and without limitation, a free space (basic state), an AP event mode (USB-connected state or earjack-connected state), CA active (CA-active state), 4RXD (4RxD-applied state), 4×4 MIMO (4×4 MIMO-applied state), or the like. For example, the electronic device 101 may tune antennas in accordance with a plurality of events such as the free space (basic state) and the AP event mode (USB-connected state or earjack-connected state) or according to the priorities of the plurality of modes. Meanwhile, in this disclosure, coarse tuning may refer, for example, to antenna tuning corresponding to a plurality of events. For example, coarse tuning may refer, for example, to primarily tuning antennas in a tuning type corresponding to at least one of the plurality of events.

The electronic device 101 may operate in configuration A in the state in which carrier aggregation is deactivated (or the electronic device 101 is served by one cell). For example, configuration A may refer, for example, to the electronic device 101 tuning antennas based on a frequency of the P cell according to events of the free space (basic state) and the AP event mode (USB-connected state or earjack-connected state). The electronic device 101 may configure a final operation mode according to the priority among available operations for the plurality of events. According to an embodiment, when carrier aggregation is activated, the electronic device 101 may operate in configuration B. For example, configuration B may refer, for example, to the electronic device 101 tuning antennas according to the CA-active event through the stored lookup table. According to an embodiment, when the voice call event is performed while carrier aggregation is activated, the electronic device 101 may operate in configuration C. For example, configuration C may refer, for example, to the electronic device 101 tuning antennas based on the transmission frequency of the P cell without using antenna-tuning modes used in the state in which carrier aggregation is activated. Configuration C may include, for example, and without limitation, antenna-tuning values for optimizing and/or improving transmission performance for the P cell. It is possible to improve the quality of the voice call event using the P cell by preventing and/or reducing the CA-active antenna mode from being used (for example, by tuning the antennas on the basis of the transmission frequency of the P cell) during the voice call event.

Figure 5A:
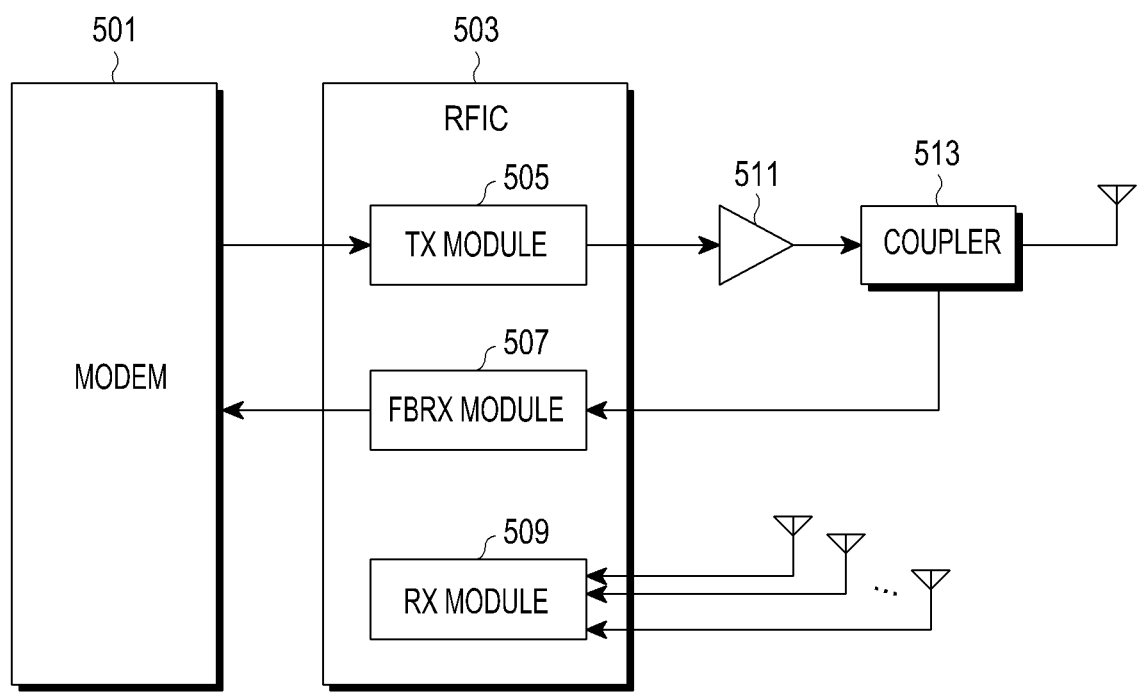
FIG. 5A is a block diagram illustrating an example electronic device according to various embodiments.

FIG. 5A is a block diagram illustrating an example electronic device according to various embodiments. The electronic device 101 of FIG. 5A, according to an embodiment, may further include a coupler (e.g., including coupling circuitry) 513 and a FeedBack Receiver (FBRX) module (e.g., including feedback receiver circuitry) 507 in addition to the elements of the electronic device 101 of FIG. 2. Since a MODEM 501, a Tx module 505, an Rx module 509, and a Pulse Amplitude Modulation (PAM) 511 are the same as or similar to those described with reference to FIG. 2, a description thereof may not be repeated here.

The electronic device 101, according to an embodiment, may receive, using the FBRX module 507, a reflected wave of a signal transmitted from the Tx module 505 through the coupler 513. When receiving the reflected wave of the transmitted signal, the MODEM 501 may analyze impedance. According to an embodiment, the electronic device 101 may tune antennas to configure the optimal and/or improved value of impedance based on the analyzed impedance. In this disclosure, fine tuning may refer, for example, to tuning a coarsely tuned value more finely in order to configure the optimal and/or improved value of impedance based on the reflected wave of the transmitted signal.

Figure 5B:
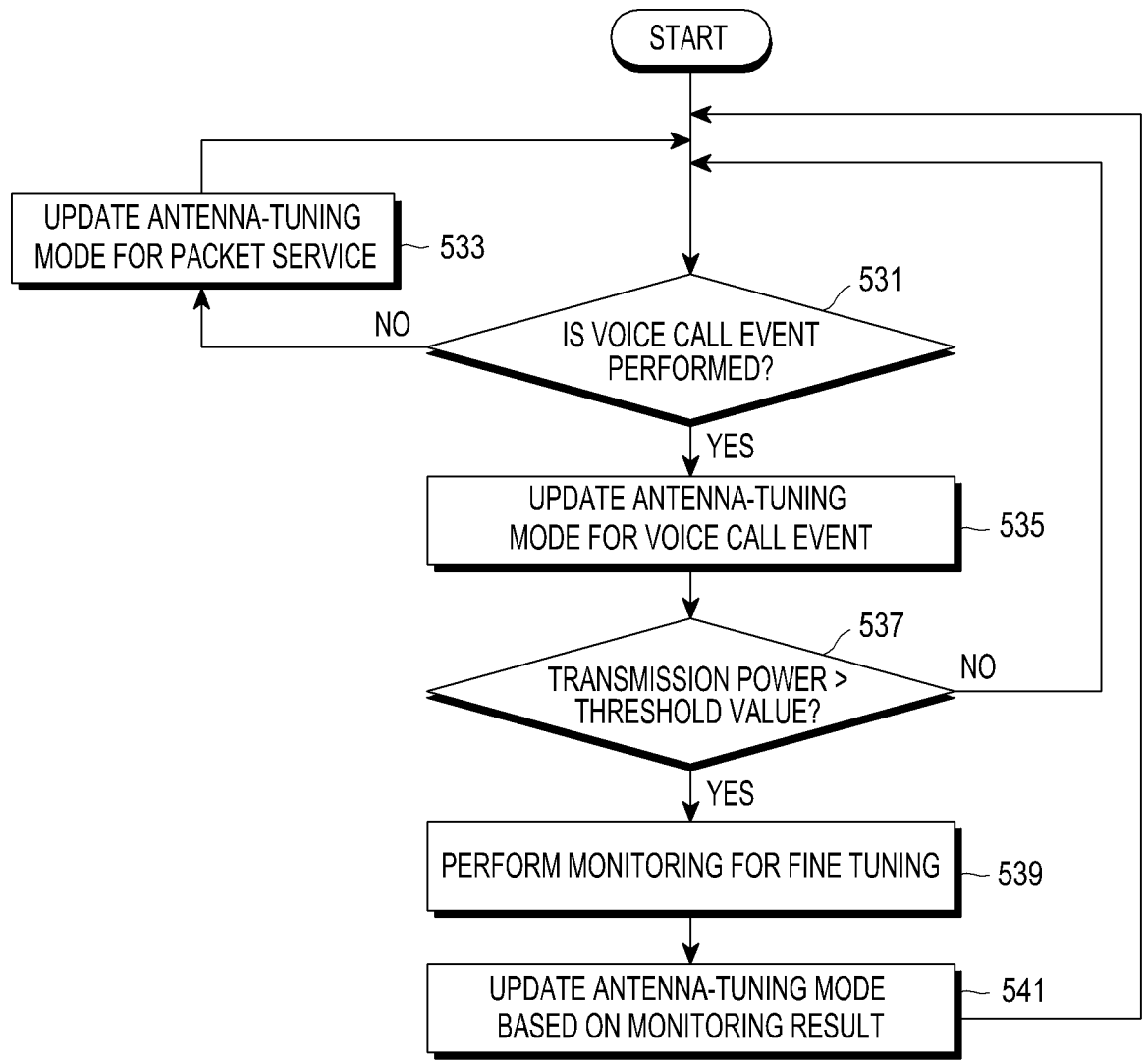
FIG. 5B is a flowchart illustrating example fine tuning in an antenna-tuning mode by the electronic device according to various embodiments.

FIG. 5B is a flowchart illustrating an example method of fine tuning in an antenna-tuning mode by the electronic device according to various embodiments. In FIG. 5B, it is assumed that carrier aggregation is activated and thus the electronic device 101 performs communication using the P cell and the S cell.

According to various embodiments, the electronic device 101 (for example, the processor 120) may identify (determine) whether the voice call event is being performed in operation 531.

According to various embodiments, when the voice call event is not being performed (No), the electronic device 101 may update an antenna-tuning mode for a data service (for example, a web browser) in operation 533. For example, the electronic device 101 may tune antennas using at least one frequency for carrier aggregation.

According to various embodiments, when the voice call event is being performed (Yes), the electronic device 101 may update (or change) the antenna-tuning mode for the voice call event in operation 535. For example, the electronic device 101 may tune antennas using at least one transmission frequency for the P cell. Since the electronic device 101 performs the voice call event mainly using the P cell, the quality of the voice call event may be improved by tuning antennas using a transmission frequency of the P cell.

According to various embodiments, the electronic device 101 may identify (determine) whether transmission power is higher than a threshold value in operation 537. When a reception electric field intensity corresponds to a middle/weak electric field, the transmission power of the electronic device 101 may increase, such that the electronic device 101 may identify (determine) whether the transmission power is higher than the threshold value and identify (determine) whether the electronic device 101 is located in a middle/weak electric field area. When the transmission power is equal to or lower than the threshold value (for example, when the electronic device 101 is located in a strong electric field) (No), the electronic device 101 may return to operation 531 and identify (determine) whether the voice call event is being performed in operation 531.

When the transmission power is higher than the threshold value (for example, when the electronic device 101 is located in a middle/weak electric field area) (Yes), the electronic device 101 may perform monitoring for fine tuning in operation 539. For example, when the input impedance of the antenna is changed due to being held in a hand (held in a segment part) in the middle/weak electric field area, the transmission efficiency of the antenna may be changed. To identify (determine) the transmission efficiency of the antenna, the electronic device 101 may receive a reflected wave of a transmission signal through the coupler and analyze impedance.

According to various embodiments, the electronic device 101 may update the antenna-tuning mode based on the monitoring result in operation 541. For example, the electronic device 101 may tune antennas to configure the optimal value of the analyzed impedance based on the reflected wave of the transmitted signal.

TABLE 1

| Coarse Tuning | Fine tuning |
| --- | --- |
| A | A1 |
|  | A2 |
|  | A3 |
| B | B1 |
|  | B2 |
|  | B3 |
| C | C1 |
|  | C2 |
|  | C3 |

[Table 1] above illustrates an example of tuning antennas while the voice call event is being performed. For example, the electronic device 101 may tune antennas for a plurality of events A, B, and C (for example, the USB and the earjack) in operation 535. When it is identified (determined) that fine tuning is needed, the electronic device 101 may tune antennas to at least some values of A1, A2, A3, B1, B2, B3, C1, C2, and C3 to configure the optimal and/or improved value of the analyzed impedance based on the reflected wave of the transmission signal. For example, when the middle/weak electric field area is identified, the electronic device 101 may optimize the antenna configuration for the voice call event by performing fine tuning. According to various embodiments, antenna tuning for the plurality of events A, B, and C (that is, coarse tuning) may be changed based on the result of fine tuning. For example, when a tuning value of A3 is changed to B1 through fine tuning, the electronic device 101 may tune antennas for event B.

Figure 6A:
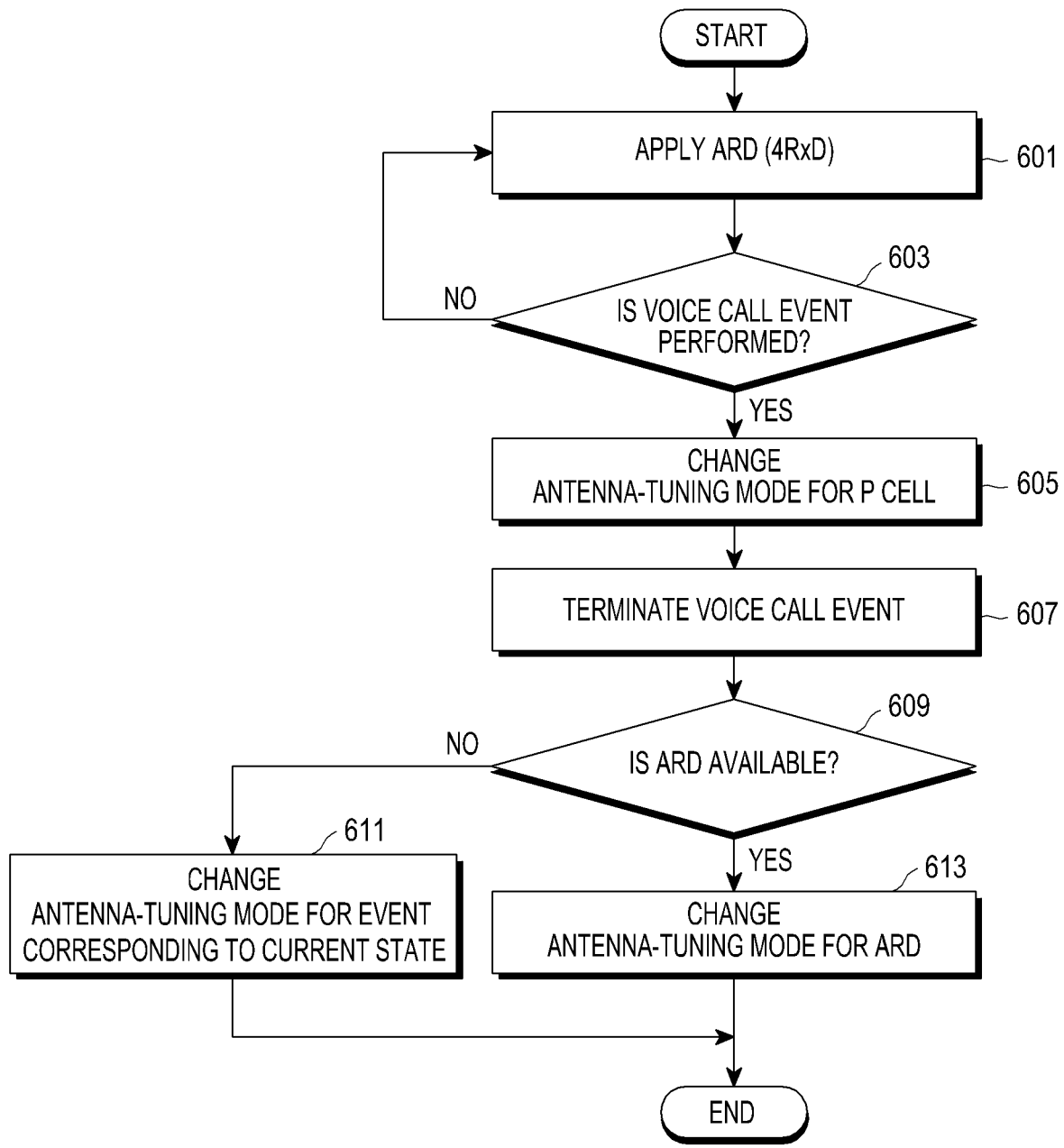
FIG. 6A is a flowchart illustrating an example operation in which the electronic device uses an antenna-tuning mode according to various embodiments.

FIG. 6A is a flowchart illustrating an example operation in which the electronic device uses an antenna-tuning mode according to various embodiments.

According to various embodiments, the electronic device 101 (for example, the processor 120) may apply Advanced Receiver Diversity (ARD) (for example, 4RxD) in operation 601. For example, the electronic device 101 may tune antennas to receive data through four antennas.

According to various embodiments, the electronic device 101 may identify (determine) whether the voice call event is being performed in operation 603. When the voice call event is not being performed, the electronic device 101 may apply ARD in operation 601. For example, the electronic device 101 may maintain an antenna-tuning mode for receiving data through four antennas.

According to various embodiments, when the voice call event is being performed, the electronic device 101 may change an antenna-tuning mode for the P cell in operation 605. For example, since the voice call event is performed mainly using the P cell, if the voice call event is performed using the tuned antennas to receive data through four antennas, the performance of the voice call event may deteriorate. When the voice call event is being performed, the electronic device 101 may improve the performance of the voice call event by tuning antennas based on the transmission frequency of the P cell.

According to various embodiments, the electronic device 101 may terminate the voice call event in operation 607.

According to various embodiments, the electronic device 101 may identify (determine) whether ARD is available in operation 609. When ARD is not available, the electronic device 101 may change the antenna-tuning mode based on an event corresponding to the current state among various events. For example, when carrier aggregation is activated, the electronic device 101 may tune antennas based on at least one frequency for carrier aggregation. Further, when the electronic device 101 operates in one cell, the electronic device 101 may tune antennas based on the transmission frequency of the P cell.

According to various embodiments, when ARD is available, the electronic device 101 may change the antenna-tuning mode to an antenna-tuning mode for ARD in operation 613. For example, when the electronic device 101 can use ARD and thus the voice call event is performed while the antenna-tuning mode for ARD is maintained, the electronic device 101 may use the antenna-tuning mode for the P cell rather than the antenna-tuning mode for ARD while the voice call event is performed, thereby improving the quality of the voice call event performed using the P cell.

Figure 6B:
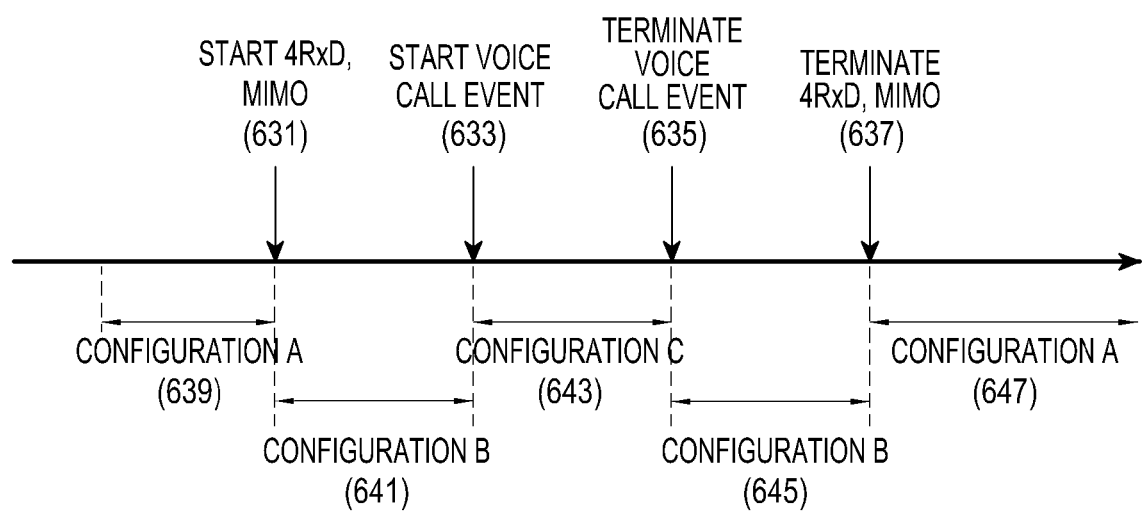
FIG. 6B is a diagram illustrating an example operation for using an antenna-tuning mode for a voice service according to various embodiments.

FIG. 6B is a diagram illustrating an example operation for using an antenna-tuning mode for a voice service according to various embodiments. Referring to FIG. 6B, when the electronic device 101 operating in configuration A 639 starts 4RxD (or a MIMO mode) as indicated by reference numeral 631, the electronic device 101 may operate in configuration B 641. 4RxD may, for example, be a mode for receiving data through four antennas. For example, the electronic device 101 may tune antennas to receive data through four antennas. When the electronic device 101 starts the voice call event while operating in configuration B 641, as indicated by reference numeral 633, the electronic device 101 may operate in configuration C 643. For example, when the voice call event starts in the state in which the electronic device 101 operates in the 4RxD mode, as indicated by reference numeral 633, the electronic device 101 may operate in configuration C 643 for tuning antennas for the performance of the P cell for the quality of the voice call event. When the voice call event ends (e.g., is terminated), as indicated by reference numeral 635, the electronic device 101 may operate in configuration B 645 again. According to an embodiment, when 4RxD (or MIMO mode) ends (e.g., is terminated), the electronic device 101 may operate in configuration A 647 again. As illustrated in FIG. 6B, when the voice call event starts while the electronic device 101 operates in configuration B 641 in accordance with 4RxD, as indicated by reference numeral 633, the electronic device 101 may operate in configuration C 643 rather than in configuration B 641. According to various embodiments, when the voice call event starts during 4RxD mode, the electronic device 101 may improve the quality of the voice call event by tuning antennas for the performance of the P cell.

Figure 7:
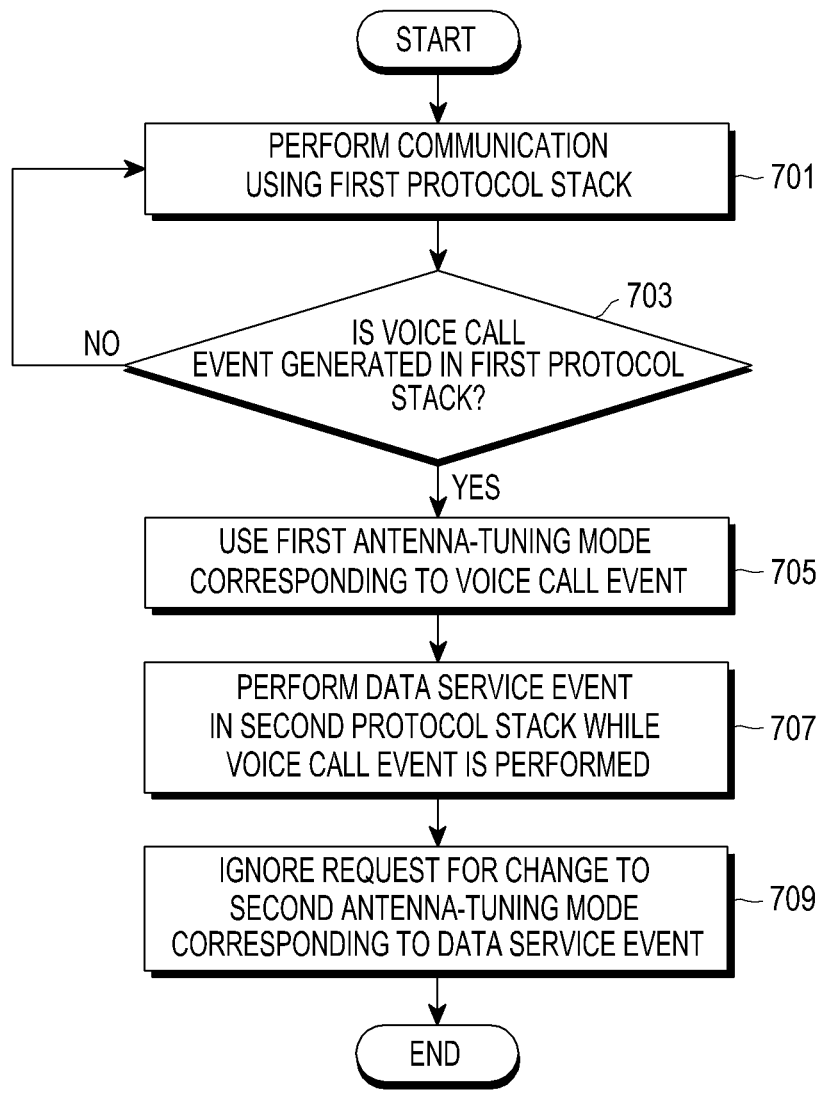
FIG. 7 is a flowchart illustrating an example operation in which the electronic device uses an antenna-tuning mode according to various embodiments.

FIG. 7 is a flowchart illustrating an example operation in which the electronic device uses an antenna-tuning mode according to various embodiments. In this disclosure, a first protocol stack and a second protocol stack may, for example, be a first Subscriber Identification Module (SIM) and a second SIM, respectively. The first protocol stack and the second protocol stack may, for example, be a stack for $4^{th}$-Generation (4G) mobile communication and a stack for $5^{th}$-Generation (5G) mobile communication, respectively. The first protocol stack and the second protocol stack may be stacks for using different pieces of hardware included within the electronic device 101, and there is no limitation as to the protocol stack type. The first protocol stack and the second protocol stack may share antennas.

According to various embodiments, the electronic device 101 (for example, the processor 120) may perform communication using the first protocol stack in operation 701.

According to various embodiments, the electronic device 101 may identify (determine) whether a voice call event is generated in the first protocol stack in operation 703. When it is identified (determined) that a voice call event is not generated in the first protocol stack, the electronic device 101 may return to operation 701 and perform communication using the first protocol stack.

When is it identified (determined) that a voice call event is generated in the first protocol stack, the electronic device 101 may use a first antenna-tuning mode corresponding to the voice call event in operation 705. For example, the electronic device 101 may tune antennas based on at least one transmission frequency for the P cell in accordance with the voice call event.

According to various embodiments, the electronic device 101 may perform a data service in the second protocol stack in operation 707 while the voice call event is being performed. The electronic device 101 may make a request for changing the antennas tuned in accordance with the voice call event to an antenna-tuning mode corresponding to the data service in the second protocol stack.

According to various embodiments, the electronic device 101 may ignore the request for changing the antenna-tuning mode to a second antenna-tuning mode corresponding to the data service event in operation 709. For example, the electronic device 101 may identify (determine) that the priority of the voice call event is higher than the data service, and even though the request for changing the state in which antennas are tuned in accordance with the voice call event to the antenna-tuning mode corresponding to the data service is made, it may ignore the request. For example, the electronic device 101 may maintain the quality of the voice call event by tuning the antennas in accordance with the voice call event while the voice call event is being performed in the first protocol stack and ignoring the request for changing to another mode.

Figure 8A:
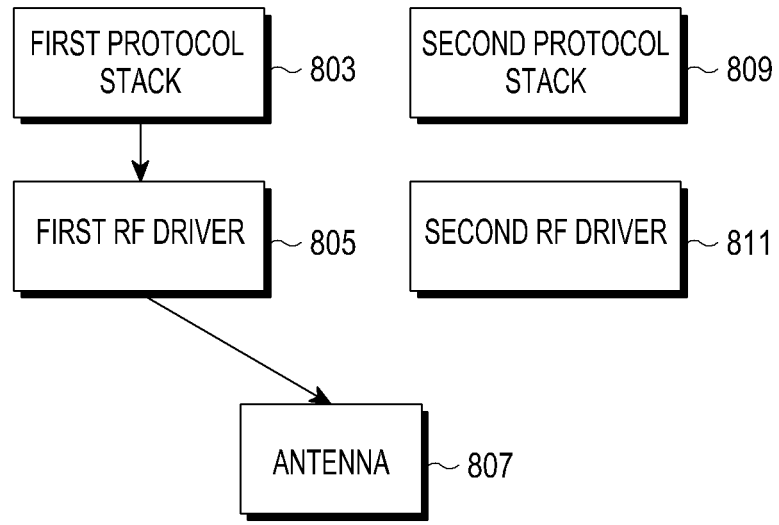
FIGS. 8A and 8B are diagrams illustrating example operations for using an antenna-tuning mode for a voice service according to various embodiments.

FIG. 8A is a diagram illustrating an example operation for using an antenna-tuning mode for a voice service according to a comparative embodiment. Referring to FIG. 8A, the voice call event may start in a first protocol stack 803. When the voice call event starts in the first protocol stack 803, a first RF driver 805 of the first protocol stack 803 may make a request for changing to an antenna-tuning mode for the voice call mode to an antenna 807. For example, the electronic device 101 may tune the antenna 807 in accordance with the voice call event. The electronic device 101 may maintain an antenna-tuning mode corresponding to the voice call event by suspending the activation of a second protocol stack 809 (and thereby the second RF driver 811) while the voice call event is being performed in the first protocol stack.

Figure 8B:
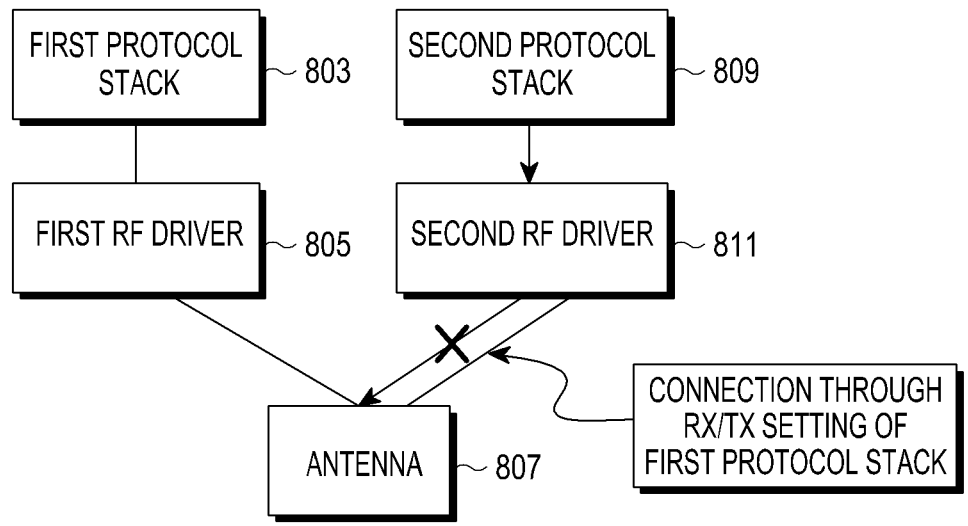

FIG. 8B is a diagram illustrating an example operation for using an antenna-tuning mode for a voice call event according to various embodiments. Referring to FIG. 8B, the voice call event may start in the first protocol stack 803. When the voice call event starts in the first protocol stack 803, a first RF driver 805 of the first protocol stack 803 may make a request for changing to an antenna-tuning mode for the voice call mode to an antenna 807. For example, the electronic device 101 may tune the antenna 807 in accordance with the voice call event. A data service may start in the second protocol stack 809 while the voice call event is performed in the first protocol stack 803. A second RF driver 811 of the second protocol stack 809 may make a request to the antenna 807 for changing to an antenna-tuning mode for the data service. The electronic device 101 may ignore the request for changing in the antenna-tuning mode from the second RF driver 811 of the second protocol stack 809 and connect to the second RF driver 811 of the second protocol stack 809 through the antenna-tuning mode corresponding to the voice call event of the first protocol stack 803. Accordingly, the electronic device 101 may maintain the antenna-tuning mode for the voice call event. For example, the electronic device 101 may perform the voice call event in the first protocol stack 803 through the antenna-tuning mode optimized and/or improved for the voice call event and provide the data service in the second protocol stack 809.

Figure 8C:
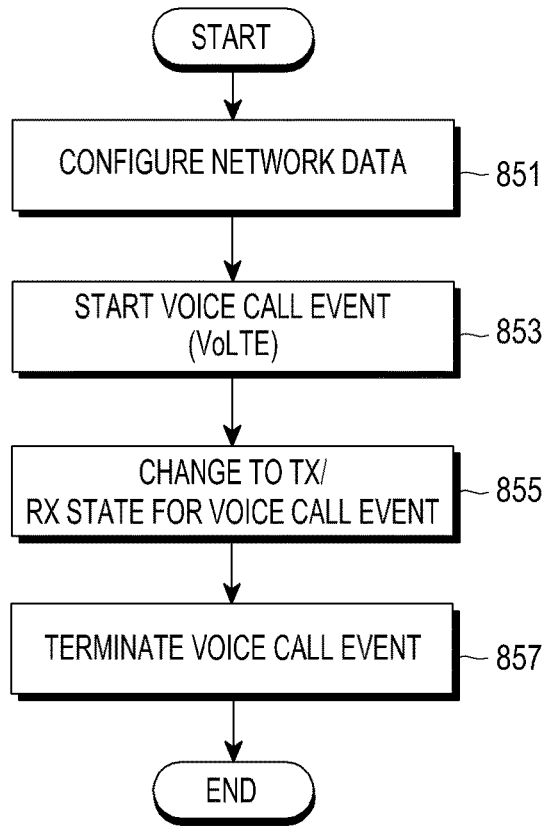
FIG. 8C is a flowchart illustrating an example operation performed in a first protocol stack according to various embodiments.
Figure 8D:
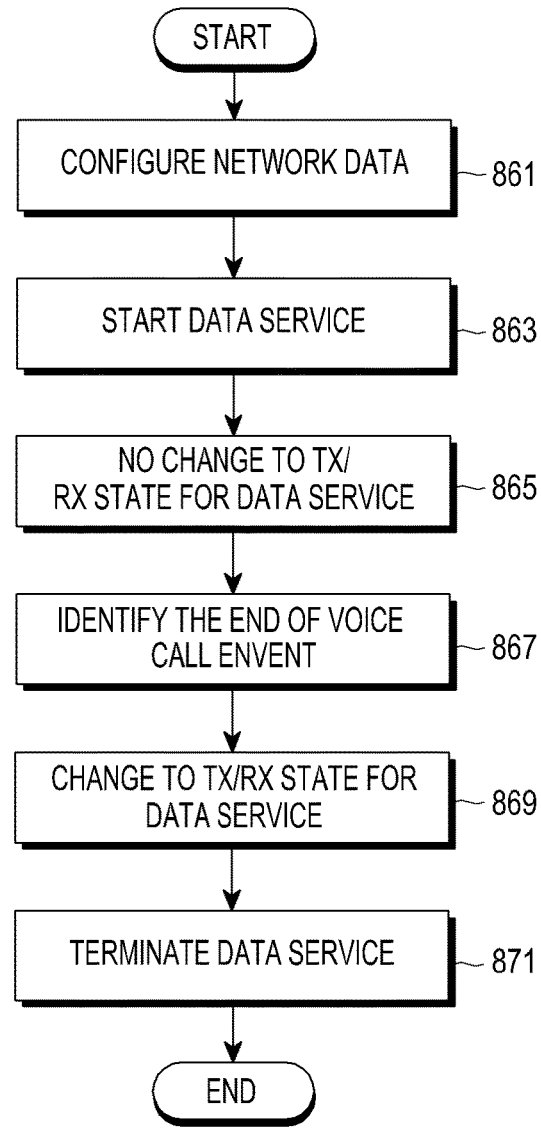
FIG. 8D is a flowchart illustrating an example operation performed in a second protocol stack according to various embodiments.

FIG. 8C is a flowchart illustrating an example operation performed in the first protocol stack according to various embodiments. FIG. 8D is a flowchart illustrating an example operation performed in the second protocol stack according to various embodiments. The electronic device 101 may operate in the first protocol stack and/or the second protocol stack.

Referring to FIG. 8C, the electronic device 101 may configure network data in the first protocol stack in operation 851 according to various embodiments.

According to various embodiments, the electronic device 101 may start the voice call event in the first protocol stack in operation 853.

According to various embodiments, the electronic device 101 may change the voice call event to a Tx/Rx state in accordance with the voice call event in operation 855. For example, the electronic device 101 may tune antennas in accordance with the voice call event.

According to various embodiments, the voice call event may end in the first protocol stack in operation 857.

Referring to FIG. 8D, the electronic device 101 may configure network data in the second protocol stack in operation 861 according to various embodiments.

According to various embodiments, the electronic device 101 may start the data service in the second protocol stack in operation 863.

According to various embodiments, the electronic device 101 may not perform the change to the Tx/Rx state for the data service in operation 865. For example, the electronic device 101 may not change antenna tuning despite performing the data service in the second protocol stack while the voice call event is performed in the first protocol stack (for example, operation 855 of FIG. 8C). For example, the electronic device 101 may identify (determine) that the priority of the voice call service is higher than the priority of the data service and maintain the antenna-tuning mode corresponding to the voice call event while the voice call event is performed. The electronic device 101 may perform the data service in the second protocol stack through the antennas tuned in accordance with the voice call event.

According to various embodiments, it may be identified that the voice call event ends in the first protocol stack in operation 867.

According to various embodiments, the electronic device 101 may perform the change to the Tx/Rx state for the data service in operation 869. For example, as the voice call event ends in the first protocol stack, the electronic device 101 may tune antennas in accordance with the data service. The electronic device 101 may perform the data service in the second protocol stack through the antennas tuned in accordance with the data service.

According to various embodiments, the electronic device 101 may terminate the data service in operation 871. As illustrated in FIGS. 8C and 8D, the electronic device 101 may maintain the antenna-tuning mode corresponding to the voice call mode (that is the second protocol stack may not change the antenna-tuning mode) while the voice call event is performed in the first protocol stack to prevent and/or reduce deterioration in the quality of the voice call event.

According to various example embodiments, an electronic device (for example, the electronic device 101) may include a housing; a wireless communication circuit (for example, the communication module 190) disposed within the housing and configured to transmit and/or receive at least one Radio Frequency (RF) signal; a plurality of antennas (for example, the antennas 211) disposed within the housing and/or as part of the housing and electrically connected to the wireless communication circuit; at least one processor (for example, the processor 120) operationally connected to the wireless communication circuit (for example, the communication module 190); and a memory (for example, the memory 130) operationally connected to the at least one processor (for example, the processor 120), wherein the memory (for example, the memory 130) is configured to store a lookup table including a first set of antenna-tuning modes for the plurality of antennas (for example, the antennas 211) and a second set of antenna-tuning modes for the plurality of antennas (for example, the antennas 211) and instructions which, when executed by the processor (for example, the processor 120), control the electronic device to: control the wireless communication circuit (for example, the communication module 190) to use a first antenna-tuning mode of the first set of antenna-tuning modes based on carrier aggregation for wireless communication being deactivated, control the wireless communication circuit (for example, the communication module 190) to use a second antenna-tuning mode of the second set of antenna-tuning modes based on carrier aggregation being activated, and control the wireless communication circuit (for example, the communication module 190) to use a third antenna-tuning mode of the first set of antenna-tuning modes during a voice call event.

According to various example embodiments, the first set may include use of at least one first frequency tuned for a Primary cell (P cell), and the second set may include use of at least one second frequency tuned for carrier aggregation.

According to various example embodiments, the third antenna-tuning mode may be the same as the first antenna-tuning mode.

According to various example embodiments, the voice call event may be based on Voice over Long-Term Evolution (VoLTE).

According to various example embodiments, the instructions, when executed by the processor (for example, the processor 120), may control the electronic device to monitor a transmission signal associated with the voice call event during the voice call event and to perform fine tuning based at least in part on impedance related to the monitored transmission signal.

According to various example embodiments, when carrier aggregation is activated, the instructions may cause the processor (for example, the processor 120) to release a 4 Rx Diversity (4RxD) mode.

According to various example embodiments, the instructions, when executed by the processor (for example, the processor 120), may control the electronic device to control the communication circuit (for example, the communication module 190) to use the second antenna-tuning mode of the second set based on the voice call event being performed ending.

According to various example embodiments, an electronic device (for example, the electronic device 101) may include a housing; a wireless communication circuit (for example, the communication module 190) disposed within the housing and configured to transmit and/or receive at least one Radio Frequency (RF) signal; a plurality of antennas (for example, the antennas 211) disposed within the housing and/or as part of the housing and electrically connected to the communication circuit (for example, the communication module 190); at least one processor (for example, the processor 120) operationally connected to the wireless communication circuit (for example, the communication module 190); and a memory (for example, the memory 130) operationally connected to the at least one processor (for example, the processor 120), wherein the memory (for example, the memory 130) is configured to store a lookup table including a first set of antenna-tuning modes for the plurality of antennas (for example, the antenna 211) and a second set of antenna-tuning modes for the plurality of antennas (for example, the antennas 211) and instructions which, when executed by the processor (for example, the processor 120), control the electronic device to: control the wireless communication circuit (for example, the communication module 190) to use a first antenna-tuning mode of the first set of antenna-tuning modes based on carrier aggregation for wireless communication being deactivated, control the wireless communication circuit (for example, the communication module 190) to use a second antenna-tuning mode of the second set of antenna-tuning modes based on carrier aggregation being activated, and control the wireless communication circuit to use a third antenna-tuning mode corresponding to a voice call based on the voice call being made while carrier aggregation is activated.

According to various example embodiments, the first set may include the use of at least one first frequency tuned for a Primary cell (P cell) and the second set may include the use of at least one second frequency tuned for carrier aggregation.

According to various example embodiments, the third antenna-tuning mode may be to the same as the first antenna-tuning mode.

According to various example embodiments, the voice call event may be based on Voice over Long-Term Evolution (VoLTE).

According to various example embodiments, the instructions, when executed by the processor, may control the electronic device to monitor a transmission signal associated with the voice call event during the voice call event and perform fine tuning based at least in part on impedance related to the monitored transmission signal.

According to various example embodiments, when carrier aggregation is activated, the instructions may, when executed by the processor (for example, the processor 120), control the electronic device to release a 4 Rx Diversity (4RxD) mode.

According to various example embodiments, the third antenna-tuning mode may be a mode of applying one of the antenna-tuning modes of the first set and performing fine tuning.

According to various example embodiments, when the voice call event being performed ends, the instructions, when executed by the processor (for example, the processor 120), control the electronic device to control the wireless communication circuit (for example, the communication module 190) to use the second antenna-tuning mode of the second set.

According to various example embodiments, an electronic device (for example, the electronic device 101) may include a housing; a wireless communication circuit (for example, the communication module 190) disposed within the housing and configured to transmit and/or receive at least one Radio Frequency (RF) signal; a plurality of antennas (for example, the antennas 211) disposed within the housing and/or as part of the housing and electrically connected to the wireless communication circuit (for example, the communication module 190); at least one processor (for example, the processor 120) operationally connected to the wireless communication circuit (for example, the communication module 190); and a memory (for example, the memory 130) operationally connected to the at least one processor (for example, the processor 120), wherein the memory (for example, the memory 130) is configured to store a lookup table including antenna-tuning modes for a plurality of antennas (for example, the antennas 211) and instructions which, when executed by the processor (for example, the processor 120), control the electronic device to: control the wireless communication circuit (for example, the communication module 190) to use a first antenna-tuning mode corresponding to a voice call based on a voice call event being generated in a first protocol stack, and ignore the request for changing to a second antenna-tuning mode based on a data service event being generated in a second protocol stack while the voice call event is performed and a request for changing to the second antenna-tuning mode corresponding to the data service event being made.

According to various example embodiments, the first protocol stack may include a stack for $4^{th}$-Generation (4G)

mobile communication and the second protocol stack may include a stack for 5$^{th}$-Generation (5G) mobile communication.

According to various example embodiments, the first protocol stack may include a stack for a first Subscriber Identification Module (SIM) and the second protocol stack may include a stack for a second SIM.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various example embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in any other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This controls the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood by one skilled in the art that the example embodiments are illustrative and not limiting. Therefore, it will be understood that various changes in form and details may be made without departing from the spirit and scope of the disclosure as set forth, for example, in the appended claims and their equivalents.

What is claimed is:

1. An electronic device comprising:
a housing;
a wireless communication circuit disposed within the housing and configured to transmit and/or receive at least one Radio Frequency (RF) signal;
a plurality of antennas disposed within the housing and/or as part of the housing and electrically connected to the wireless communication circuit;
at least one processor operationally connected to the wireless communication circuit; and
a memory operationally connected to the at least one processor,
wherein the memory is configured to store a lookup table including a first set of antenna-tuning modes for the plurality of antennas and a second set of antenna-tuning modes for the plurality of antennas and instructions which, when executed by the processor, control the electronic device to: control the wireless communication circuit to use a first antenna-tuning mode of the first set of antenna-tuning modes based on carrier aggregation for wireless communication being deactivated, control the wireless communication circuit to use a second antenna-tuning mode of the second set of antenna-tuning modes based on the carrier aggregation being activated, and control the wireless communication circuit to use a third antenna-tuning mode of the first set of antenna-tuning modes during a voice call event.

2. The electronic device of claim 1, wherein the electronic device is configured to use at least one first frequency tuned for a Primary cell (P cell) in the first set of antenna-tuning modes and to use at least one second frequency tuned for the carrier aggregation in the second set of antenna-tuning modes.

3. The electronic device of claim 2, wherein the third antenna-tuning mode is the same as the first antenna-tuning mode.

4. The electronic device of claim 3, wherein the voice call event is based on Voice over Long-Term Evolution (VoLTE).

5. The electronic device of claim 1, wherein the instructions, when executed by the processor, control the electronic device to monitor a transmission signal associated with the voice call event during the voice call event and to perform fine tuning, based at least in part on impedance related to the monitored transmission signal.

6. The electronic device of claim 1, wherein, the instructions, when executed by the processor, control the electronic device to release a 4 RxDiversity (4RxD) mode based on the carrier aggregation being activated.

7. The electronic device of claim 1, wherein, the instructions, when executed by the processor, control the electronic device to control the communication circuit to use the second antenna-tuning mode of the second set of antenna-tuning modes based on the voice call event being performed ending.

8. An electronic device comprising:
a housing;
a wireless communication circuit disposed within the housing and configured to transmit and/or receive at least one Radio Frequency (RF) signal;
a plurality of antennas disposed within the housing and/or as part of the housing and electrically connected to the wireless communication circuit;
at least one processor operationally connected to the wireless communication circuit; and
a memory operationally connected to the at least one processor,
wherein the memory is configured to store a lookup table including a first set of antenna-tuning modes for the plurality of antennas and a second set of antenna-tuning modes for the plurality of antennas and instructions which, when executed by the processor, control the electronic device to: control the wireless communication circuit to use a first antenna-tuning mode of the first set of antenna-tuning modes based on carrier aggregation for wireless communication being deactivated, control the wireless communication circuit to use a second antenna-tuning mode of the second set of antenna-tuning modes based on the carrier aggregation being activated, and use a third antenna-tuning mode corresponding to a voice call based on the voice call being made while the carrier aggregation is activated.

9. The electronic device of claim 8, wherein the electronic device is configured to use at least one first frequency tuned for a Primary cell (P cell) in the first set of antenna-tuning modes and to use at least one second frequency tuned for the carrier aggregation in the second set of antenna-tuning modes.

10. The electronic device of claim 9, wherein the third antenna-tuning mode is the same as the first antenna-tuning mode.

11. The electronic device of claim 10, wherein the voice call event is based on Voice over Long-Term Evolution (VoLTE).

12. The electronic device of claim 8, wherein the instructions, when executed by the processor, control the electronic device to monitor a transmission signal associated with the voice call event during the voice call event and to perform fine tuning, based at least in part on impedance related to the monitored transmission signal.

13. The electronic device of claim 8, wherein, the instructions, when executed by the processor, control the electronic device to release a 4 RxDiversity (4RxD) mode based on the carrier aggregation being activated.

14. The electronic device of claim 9, wherein the third antenna-tuning mode includes a mode of applying one of antenna-tuning modes belonging to the first set of antenna-tuning modes and performing fine tuning.

15. The electronic device of claim 8, wherein, the instructions, when executed by the processor, control the electronic device to control the wireless communication circuit to use the second antenna-tuning mode of the second set of antenna-tuning modes based on the voice call event being performed ending.

16. An electronic device comprising:
a housing;
a wireless communication circuit disposed within the housing and configured to transmit and/or receive at least one Radio Frequency (RF) signal;
a plurality of antennas disposed within the housing and/or as part of the housing and electrically connected to the wireless communication circuit;

at least one processor operationally connected to the wireless communication circuit; and a memory operationally connected to the at least one processor, wherein the memory is configured to store a lookup table including antenna-tuning modes for a plurality of antennas and instructions which, when executed by the processor, control the electronic device to: control the wireless communication circuit to use a first antenna-tuning mode corresponding to a voice call based on a voice call event being generated in a first protocol stack, and ignore a request for a change to the antenna-tuning mode based on a data service event being generated in a second protocol stack while the voice call event is performed, and the request for a change to a second antenna-tuning mode corresponding to the data service event being made.

17. The electronic device of claim 16, wherein the first protocol stack includes a stack for $4^{th}$-Generation (4G) mobile communication and the second protocol stack includes a stack for $5^{th}$-Generation (5G) mobile communication.

18. The electronic device of claim 16, wherein the first protocol stack includes a stack for a first Subscriber identification Module (SIM) and the second protocol stack includes a stack for a second SIM.

* * * * *